Aug. 28, 1934.  W. ERNST  1,971,850
PRESS
Filed Jan. 6, 1932  2 Sheets-Sheet 2
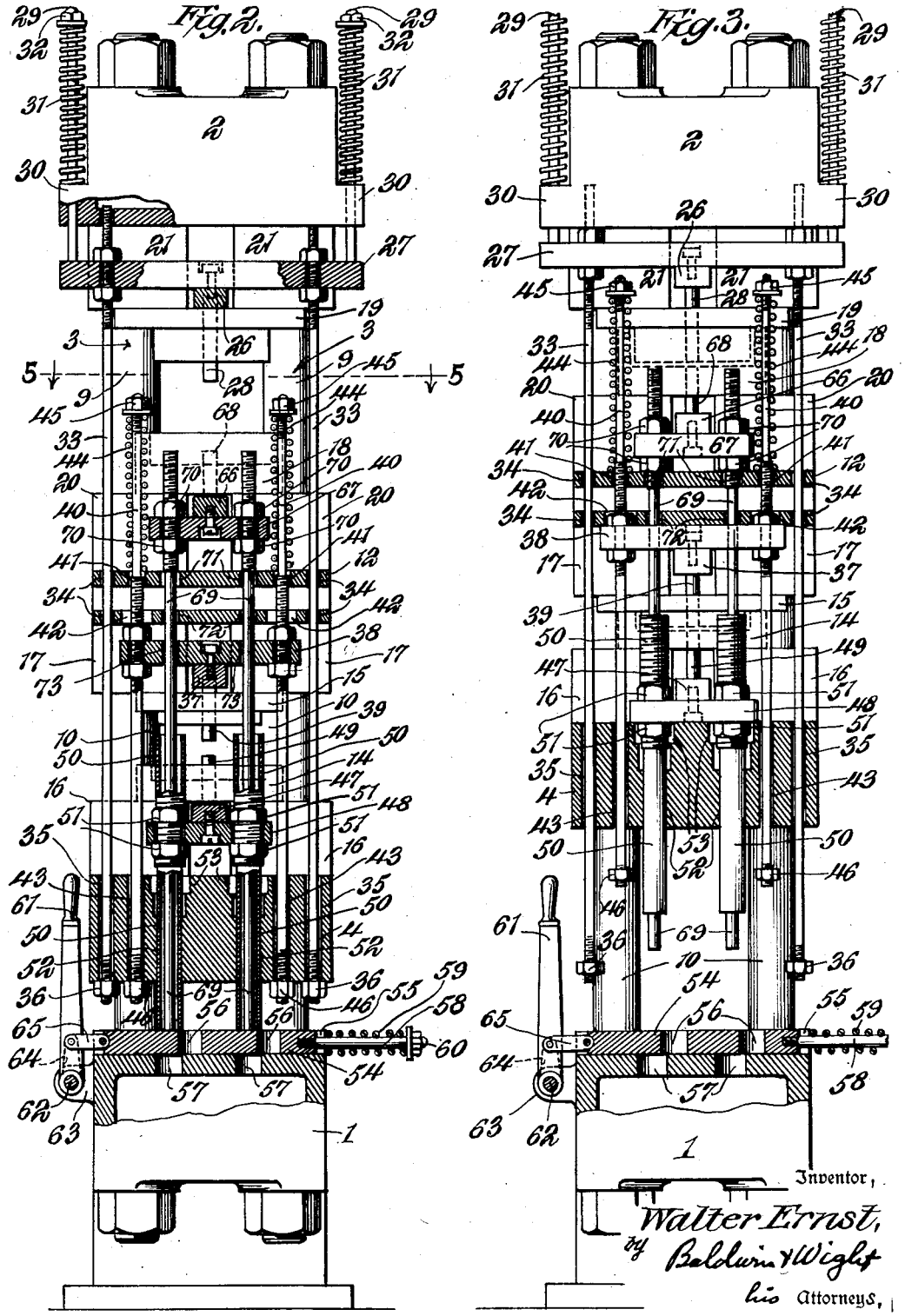
Inventor,
Walter Ernst,
by Baldwin & Wight
his Attorneys.

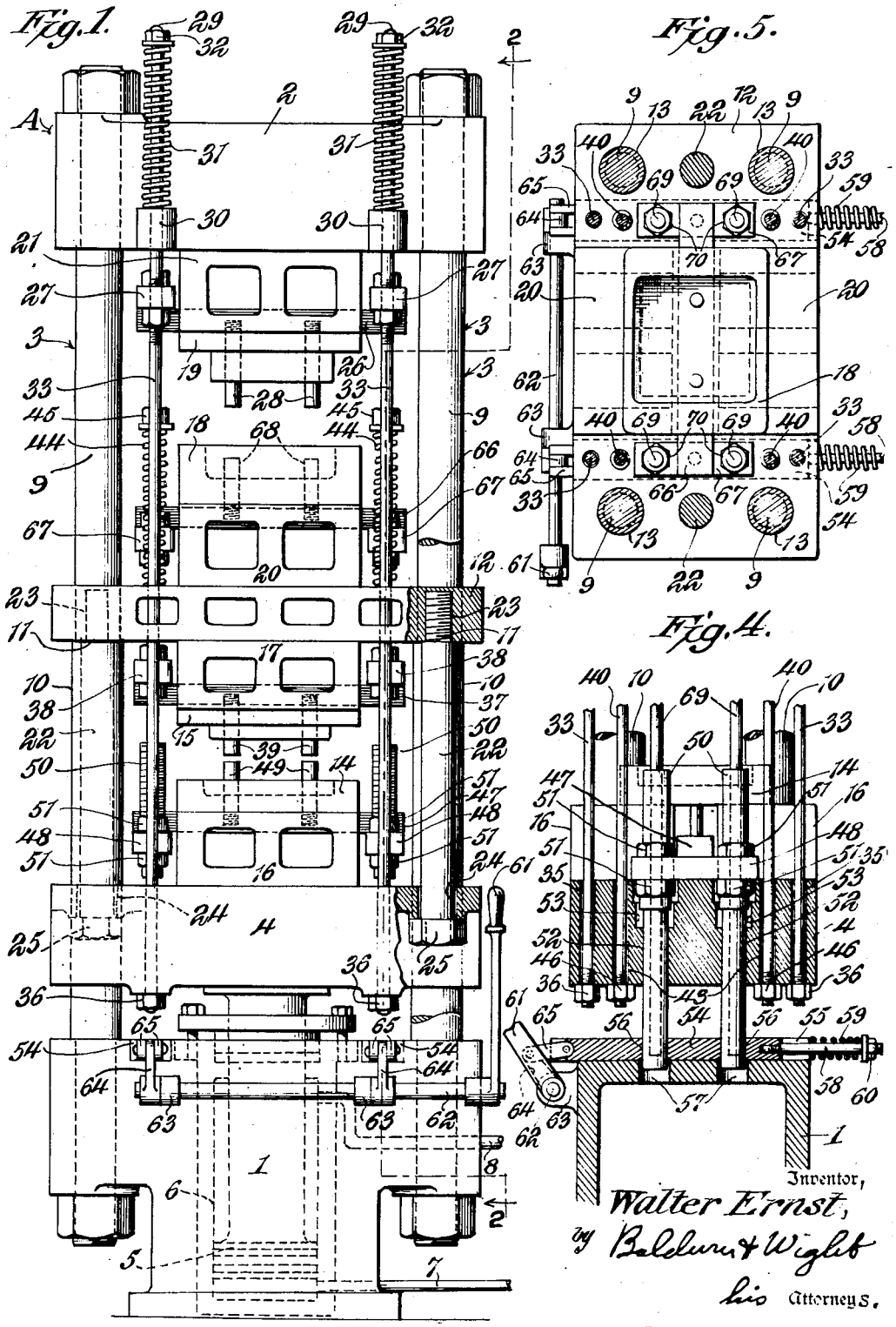

Patented Aug. 28, 1934

1,971,850

UNITED STATES PATENT OFFICE 1,971,850

PRESS

Walter Ernst, Mount Gilead, Ohio, assignor to The Hydraulic Press Manufacturing Company, Mount Gilead, Ohio Application January 6, 1932, Serial No. 585,093

14 Claims. (Cl. 18—16)

This invention relates particularly to presses of the kind used for forming molded articles from hard rubber, bakelite or other plastic or semi-plastic materials.

Such articles are usually formed in molds including cooperating members respectively carried by a fixed part and a movable part of a power operated press, means being provided in some instances for heating the molds for well-known purposes. It frequently happens that when the mold members are separated after completion of the molding or pressing operation the formed article will stick to one or the other of the mold parts. In order to release articles which have become stuck in this way it is sometimes necessary to provide knockout devices capable of exerting pressure on the formed article after separation of the mold parts, such pressure acting to break the sticking relation and at least to partially eject the formed article from the mold.

An object of this invention is to provide improved mechanism for operating such knockout devices automatically when the mold members are separated after completion of a molding operation.

Another object of the invention is to provide an improved press construction embodying a fixed mold support, a driven mold support and a movable intermediate mold support mounted between said fixed and said driven supports, in combination with knockout devices for molds positioned on said three supports and novel mechanism for operating said devices.

Other objects will become apparent from a reading of the following detailed description, the appended claims and the accompanying drawings.

In the drawings:

Figure 1 is a view in front elevation of a press embodying invention, certain parts being shown in section;

Figure 2 is a vertical sectional view taken on the line 2—2 of Figure 1;

Figure 3 is a view similar to Figure 2, but showing certain parts in different positions;

Figure 4 is a fragmentary vertical sectional view taken at right angles to Figure 1 and showing certain parts of the press in still other positions;

Figure 5 is a horizontal sectional view taken on the line 5—5 of Figure 2.

For the purposes of illustration the invention is shown as being embodied in a press A of the upward acting type including a base 1, and a fixed mold support or press head 2 connected to the base by means of strain rods or side frame members 3. A driven mold support or platen 4 is mounted on the strain rods for reciprocatory movements towards and from the fixed mold support, 2. A double acting hydraulic ram 5 is connected to the platen 4 and is mounted in a cylinder 6 for positively driving the platen both towards and from the press head 2. Fluid for operating the ram and platen may be supplied to the opposite ends of the cylinder 6 by any suitable means forming part of a hydraulic circuit such as pipes 7 and 8.

Each of the strain rods 3 is formed with a reduced upper portion 9 and an enlarged lower portion 10, the juncture of said upper and lower portions forming a resultant upwardly facing shoulder 11. An intermediately disposed mold support 12 is mounted for sliding movements on the reduced portions 9 of the strain rods 3, this support being provided with apertures 13 through which the upper portions of the strain rods pass. The shoulders 11 on the strain rods serve as stops for limiting the downward movement of the intermediate support 12.

A pair of cooperating mold members 14, 15 is carried by the driven mold support 4 and the intermediate support 12, the female member 14 being mounted on spaced bolsters or blocks 16, 16 carried by the driven mold support 4 and the male member 15 being secured to spaced bolsters or blocks 17, 17 carried by the lower face of the intermediate support.

A second pair of cooperating mold members 18 and 19 is carried by the intermediate support 12 and the fixed mold support 2 respectively, the female member 18 being mounted on spaced bolsters or blocks 20, 20 carried by the intermediate support 12 and the male member 19 being secured to spaced bolsters or blocks 21, 21 carried by the head or fixed support 2.

In operation the desired amount of plastic or semi-plastic material is placed in the lower mold members 14 and 18 and the driven support 4 is then caused to move upwardly by introducing fluid under pressure to the pipe 7 into the cylinder 6. The driven support 4 will rise until the upper face of the mold member 14 engages the lower face of the mold member 15, after which further movement of the driven support 4 will lift the intermediate support 12 and the mold members attached thereto until the upper face of the mold member 18 engages the lower face of the mold member 19. Since the mold member 19 is carried by the fixed mold support or head 2 there can be no further movement of the driven and intermediate supports. After the molds have been held closed for the time necessary to complete the formation of the molded articles the driven support 4 will be caused to move downwardly by introducing fluid under pressure through the pipe 8 into the upper end of the cylinder 6. Generally, as soon as the driven support 4 begins to move downwardly the intermediate support 12 will follow it under the influence of its own weight and weight of the attached mold members 15 and 18 and the bolsters 17 and 20. However, in some cases the intermediate support 12 will not descend under the influence of its own weight, and in order that return of the intermediate support to its initial position be assured, I have provided lost motion connection between the driven support 4 and the intermediate support.

The lost motion connections shown include a pair of rods 22, 22 having their upper ends threaded into openings 23 in the opposite sides of the intermediate support 12, the lower ends of the rods 22 extending down through openings 24 in the driven support 4. The lower end of each rod 22 is provided with a nut 25 adapted to be engaged by the movable support 4 when the latter moves downwardly so as to positively drive the intermediate support downwardly and to return it to its Figure 1 position.

In accordance with the invention knockout devices are provided for removing formed articles from both pairs of mold members 14 and 15 and 18 and 19. In some cases it may be sufficient to provide only one mold member of each pair with such knockout devices, but preferably both members of each pair are provided with such devices. Whether or not only one or both members of a pair need be provided with knockout devices depends somewhat upon the particular nature and shape of the mold being used.

Referring to the mold member 19 secured to the fixed mold support 2, I have illustrated knockout mechanism including a bar 26 extending between the spaced bolsters 21, 21 and being secured at its opposite ends to two bars 27, 27 extending at right angles to the bar 26 and being disposed outside of the bolsters 21, and a pair of knockout pins 28, 28 connected to the bar 26 and extending through openings in the mold member 19. In order to maintain the pins 28 in elevated position so that they will not project into the mold cavity during the molding operation, I have provided four rods 29, respectively connected to opposite ends of the outside bars 27 and each extending upwardly through one of a plurality of lugs 30 on the press head. Springs 31 interposed between the lugs 30 and nuts 32 on the upper ends of the rods 29 urge the rods, the bars 27, the bar 26 and the pins 28 upwardly, thereby normally maintaining the pins 28 in inoperative position.

For moving the pins 28 and the associated mechanism downwardly after a molding operation has been completed in order to forcibly remove the molded article from the mold member 19, I have provided four rods 33 respectively rigidly connected at opposite ends of the bars 27 and extending downwardly through openings 34 in the intermediate support 12 and openings 35 in the driven support 4, the lower end of each of said rods being provided with a nut 36 adapted to be engaged by the lower face of the driven support 4 when the latter approaches the end of a downward or return stroke.

In operation, assuming the parts to be in the positions shown in Figure 3 wherein the driven support 4 and the intermediate support 12 are in elevated position and the mold members 18 and 19 are in cooperative engagement the pins 28 will be elevated by means of the springs 31. After the molding operation has been completed the driven support 4 and the intermediate support 12 will be moved downwardly in the manner described above. When the support 4 approaches its lower position it will engage the nuts 36 on the rods 33 and will move the rods downwardly, thereby moving the bars 27 and 26 and the pins 28 downwardly so as to project the pins through the mold member 19 and to thereby remove the molded article therefrom.

A similar knockout mechanism is provided for the mold member 15 secured to the lower face of the intermediate support 12. This mechanism includes a bar 37 extending between the spaced bolsters 17, 17 and being secured at its opposite ends to bars 38, 38 disposed at right angles to the bar 37 and at the opposite ends to the bolsters 17, and a pair of knockout pins 39, 39 connected to the bar 37. Four rods 40 are respectively secured to the opposite ends of the bars 38 and extend through openings 41 and 42 in the intermediate support and through openings 43 in the driven mold support 4. Springs 44 interposed between the upper face of the intermediate support and nuts 45 on the upper ends of the rods 40 serve to normally maintain the members 38 and 37 and the pins 39 in elevated position as shown in Figure 3, so that during the molding operation the pins 39 will not project into the mold cavity.

The lower ends of the rods 40 are provided with nuts 46 adapted to be engaged by the lower face of the driven support 4 when the latter approaches the end of a downward or return stroke. After engagement of the support 4 with the nuts 46 further downward movement of the support will move the rods 40 downwardly against the urge of the springs 44 to thereby lower the bars 38 and 37 and the pins 39 so as to project the latter through the mold member 15 and to remove the molded article therefrom.

Knockout mechanism for the mold member 14 comprises a bar 47 extending between the bolsters 16, 16 and being secured at its opposite ends to bars 48, 48 extending at right angles to the bar 47 and at opposite ends of the bolsters 16, and pins 49 connected to the bar 47 and extending upwardly through the mold member 14. Four tubular push rods 50 extend through opposite ends of the bars 48 and are exteriorly threaded for the reception of nuts 51 which serve to secure the tubular rods 50 to the bars 48. The rods 50 extend downwardly through openings 52 in the driven support 4 and are freely slidable therein. The upper ends of the openings 52 are shown as being countersunk at 53 in order to permit the bars 48 to rest upon the mold support 4 as shown in Figures 3 and 4.

A pair of spaced abutment plates 54 is mounted in guideways 55 formed in the base 1 and extend under the tubular push rods 50, these plates being formed with apertures 56 adapted to register with apertures 57 in the press base and respectively aligned with the push rods 50. Each abutment plate 54 is provided at one end with an outwardly extending rod 58 which is urged outwardly by means of a spring 59 interposed between the base 1 and a nut 60 on the end of the rod. The springs 59 thus normally maintain the plates 54 in the positions shown in Figures 2 and 3 wherein apertures 56 in the plates are disposed to the right of the tubular push rods 50. For moving the plates 54 to the left of their Figure 4 positions I have provided a manually operable lever 61 secured to a rock shaft 62 journalled in brackets 63 on the press base, the rock shaft being connected to the plates 54 by means of crank arms 64 on the rock shaft and links 65 interposed between the respective cranks and the plates 54.

In operation, assuming that the parts are in the positions shown in Figure 3 and assuming that the molding operation has been completed the driven mold support 4 will be moved downwardly to separate the mold members 14 and 15. When the support 4 approaches the end of its downward stroke the lower ends of the tubular push rods 50 will engage the abutment plates 54 thereby preventing further downward movement of the tubular push rods, the bars 48 and 47 and the knockout pins 49. The support 4 and the mold member 14 will, however, continue to move downwardly for a short distance, having the effect of projecting the knockout pins 49 upwardly through the mold member 14 and forcibly removing the molded article therefrom. Before starting another molding operation it is necessary to retract the knockout pins 49 from the mold cavity. In order to accomplish this the lever 61 is rocked in a counter-clockwise direction so as to slide the plates 54 to the left to their Figure 4 positions, thus bringing the apertures 56 in the plates into registry with the apertures 57 in the press base and permitting the push rods 50 to descend further until the plates 48 engage the upper face of the driven mold support 4 at which time the pins 49 will have been retracted from the mold cavity.

The knockout mechanism for the mold member 18 is in general similar to that provided for the mold member 14 and described above. The mechanism for the mold member 18 includes a bar 66 extending between the spaced bolsters 20, 20 and secured at its opposite ends to bars 67, 67 which extend at right angles to the bar 66 and which are disposed on the outside of the bolsters 20, and knockout pins 68 connected to the bar 66 and extending upwardly through the mold member 18. Four push rods 69 are respectively secured to the opposite ends of the bars 67 by means of nuts 70 and extend downwardly through openings 71 and 72 in the intermediate support 12 and through the tubular push rods 50. The lower ends of the rods 69 are adapted to engage the abutment plates 54 during a downward stroke of the driven support 4 for operating the knockout pins 68 in a manner similar to that in which the tubular push rods 50 engage the plates 54 for operating the pins 49.

In order that the sequence of operation of the various parts of the press and knockout mechanism be clearly understood a complete operating cycle will be briefly set forth. It will be assumed that a preceding return stroke of the driven mold support 4 has just been completed. To prepare the molds for another molding operation, the lever 61 is operated to move the plates 54 to the position shown in Figure 4 so as to permit the push rods 50 and 69 to descend. This will withdraw the push pins 49 from the cavity of the mold member 14 and the push pins 68 from the cavity of the mold member 18. The desired amount of material is then placed in the mold members 14 and 18 and the driven support 4 is caused to move upwardly in the manner previously described. During upward movement of the support 4 the nuts 36 and 46 will be released, the springs 31 will raise the bars 27, the bar 26 and the pins 28 so as to retract the latter; and the springs 44 will raise the rods 40, the bars 38, the bar 37 and the pins 39 so as to retract the latter. The driven support 4 will continue to move upwardly until the parts have reached the positions shown in Figure 3, wherein they will remain until the molding operation has been completed.

After completion of the molding operation the driven support 4 will be moved downwardly as described above, thereby positively pulling the intermediate support 12 downwardly and effecting separation of the mold member 14 from its cooperating mold member 15 and separating the mold member 18 from its cooperating mold member 19. When the driven support 4 approaches the end of its downward stroke the nuts 46 and 36 will be engaged by the support 4 so as to project the pins 39 and 28 through their associated mold members 15 and 19, thereby removing the articles from the mold members in case the articles have adhered thereto. When the driven support 4 is approaching the limit of its downward travel the push rods 69 and 50 will engage the abutment plates 54 thereby projecting the knockout pins 68 and 49 through their associated mold members 18 and 14 in the manner described above, so as to remove the molded articles from the mold members in case the articles have adhered thereto. It will be observed that by means of the mechanism described, a molded article will be forcibly removed from any one of the four mold members with which the press is equipped.

Although the press and the knockout mechanism shown and described herein is considered to represent the particular embodiment of the invention, it will be understood that various changes may be made in the construction and relative arrangement of parts without departing from the spirit of the invention as defined in the claims. It will also be understood that the molds illustrated have been selected only for the purposes of describing the invention and that various other kinds of molds may be employed in practicing the invention.

I claim:

1. In a press, the combination of a first mold support; a second mold support movable towards and away from said first mold support; an intermediate mold support movably mounted between said first two supports; pairs of cooperating mold members carried by said supports; knockout devices respectively associated with one member of each of said pairs; and positive driving means directly responsive to movement of said second mold support to a predetermined position for operating said knockout devices.

2. In a press, the combination of a first mold support; a second mold support movable towards and away from said first mold support; an intermediate mold support movably mounted between said first two supports; pairs of cooperating mold members carried by said supports; knockout devices respectively associated with both members of each of said pairs; and positive driving means directly responsive to movement of said second mold support to a predetermined position for operating said knockout devices.

3. In a press, the combination of a fixed mold support; a driven mold support movable towards and from said fixed mold support; an intermediate mold support disposed between said fixed and said driven mold supports; a pair of cooperating mold members of which one member is mounted on said fixed support and the other on the adjacent side of said intermediate support; a pair of cooperating mold members of which one is mounted on said driven support and the other on the adjacent side of said intermediate support; knockout devices for one member of each of said pairs; and positive driving means connected between said devices and said supports and being operable during movement of said driven support for operating said knockout devices.

4. In a press, the combination of a fixed mold support; a driven mold support movable towards and from said fixed mold support; an intermediate mold support disposed between said fixed and said driven mold supports; a pair of cooperating mold members of which one member is mounted on said fixed support and the other on the adjacent side of said intermediate support; a pair of cooperating mold members of which one is mounted on said driven support and the other on the adjacent side of said intermediate support; knockout devices for one member of each of said pairs; means for normally maintaining said knockout devices in inoperative position; and means actuated by said driven support for operating said devices.

5. In a press, the combination of a fixed mold support; a driven mold support movable towards and from said fixed mold support; an intermediate mold support disposed between said fixed and said driven mold supports; a pair of cooperating mold members of which one member is mounted on said fixed support and the other on the adjacent side of said intermediate support; a pair of cooperating mold members of which one is mounted on said driven support and the other on the adjacent side of said intermediate support; knockout devices for one member of each of said pairs; spring means for normally maintaining said knockout devices in inoperative position; and rods connected to said devices and adapted to be actuated by said driven support for operating said devices.

6. In a press, the combination of a fixed mold support; a driven mold support movable towards and from said fixed mold support; an intermediate mold support disposed between said fixed and said driven mold supports; a mold member carried by said fixed support and facing said intermediate support; a mold member carried by said intermediate support and facing said driven support; knockout devices respectively associated with each of said mold members; means for normally maintaining said devices in inoperative position; rods connected to said devices; and means on said rods engageable by said driven support for moving said devices to operative position.

7. In a press, the combination of a fixed mold support; a driven mold support movable towards and from said fixed mold support; an intermediate mold support disposed between said fixed and said driven mold supports; a mold member carried by said fixed support and facing said intermediate support; a knockout device associated with said mold member; a spring connected to said knockout device for urging it to its inoperative position; a rod connected to said device; means on said rod adapted to be engaged by said driven support for moving said knockout device to its operative position; a mold member carried by said intermediate support and facing said driven support; a knockout device associated with said last named mold member; a spring connected to said last named knockout device for urging it to its inoperative position; a rod connected to said last named knockout device; and means on said rod adapted to be engaged by said driven support for moving said last named knockout device to its operative position.

8. In a press, the combination of a framework; a fixed mold support; a driven mold support movable towards and from said fixed mold support; an intermediate mold support disposed between said fixed and said driven mold supports; a mold member carried by said driven support and facing said intermediate support; a mold member carried by said intermediate support and facing said fixed support; knockout devices respectively associated with each of said mold members; means for normally maintaining said devices in inoperative position; and rods connected to said knockout devices and being engageable with said framework during movement of said driven and said intermediate die supports for operating said knockout devices.

9. In a press, the combination of a framework; a fixed mold support; a driven mold support movable towards and from said fixed support; an intermediate mold support movably mounted on said framework between said driven support and said fixed support; a mold member carried by said driven support and facing said intermediate support; a knockout device associated with said driven support; a tubular push rod connected to said device and being engageable with said framework during separating movement of the driven support for operating said knockout device; a mold member carried by said intermediate support and facing said fixed support; a knockout device associated with said intermediate support; and a rod connected to said knockout device and extending through said tubular push rod and being engageable with said framework.

10. In a press, the combination of a base; a press head; side frame members connecting said base and head; a driven reciprocatory mold support; an intermediate mold support mounted on said side frame members between said press head and said driven mold support for reciprocation towards and from said head; means for limiting movement of said intermediate support in a direction away from said head; a lost motion driving connection between said driven mold support and said intermediate mold support; pairs of cooperating mold members carried by said head and supports; knockout devices respectively associated with one member of each of said pairs; and means directly responsive to movement of said driven support to a predetermined position for operating said knockout devices.

11. In a press, the combination of a base; a press head; side frame members connecting said base and head; a driven reciprocatory mold support; an intermediate mold support mounted on said side frame members between said press head and said driven mold support for reciprocation towards and from said head; means for limiting movement of said intermediate support in a direction away from said head; a lost motion driving connection between said driven mold support and said intermediate mold support; pairs of cooperating mold members carried by said head and supports; knockout devices respectively associated with that member of each pair which faces towards said press head; and rods respectively connected to said knockout devices and extending in the direction of travel of said driven support for engagement with the said base during movement of said driven support in a direction away from said press head.

12. In a press, the combination of a base; a press head; side frame members connecting said base and head; a driven reciprocatory mold support; an intermediate mold support mounted on said side frame members between said press head and said driven mold support for reciprocation towards and from said head; means for limiting movement of said intermediate support in a direction away from said head; a lost motion driving connection between said driven mold support and said intermediate mold support; pairs of cooperating mold members carried by said head and supports; knockout devices respectively associated with that member of each pair which faces towards said press head; a movable abutment slidably mounted on said base; and rods respectively connected to said knockout devices and extending in the direction of travel of said driven support and being adapted to engage said abutment during movement of said driven support away from said press head; and means for moving said abutment into and out of the path of said rods.

13. In a press, the combination of a base; a press head; side frame members connecting said base and head; a driven reciprocatory mold support; an intermediate mold support mounted on said side frame members between said press head and said driven mold support for reciprocation towards and from said head; means for limiting movement of said intermediate support in a direction away from said head; a lost motion driving connection between said driven mold support and said intermediate mold support; pairs of cooperating mold members carried by said head and supports; knockout devices respectively associated with that member of each pair which faces towards said base; rods respectively connected to said knockout devices and extending in the direction of travel of said driven support; and means on said rods adapted to be engaged by said driven support when the latter is moving away from said press head.

14. In a press, the combination of a base; a press head; side frame members connecting said base and head; a driven reciprocatory mold support; an intermediate mold support mounted on said side frame members between said press head and said driven mold support for reciprocation towards and from said head; means for limiting movement of said intermediate support in a direction away from said head; a lost motion driving connection between said driven mold support and said intermediate mold support; pairs of cooperating mold members carried by said head and supports; knockout devices respectively associated with that member of each pair which faces towards said base; rods respectively connected to said knockout devices and extending in the direction of travel of said driven support; springs connected to said rods for normally maintaining the knockout devices in inoperative positions; and enlargements on said rods adapted to be engaged by said driven support when the latter is moving away from said press head to thereby move said knockout devices to their operative positions against the urge of said springs.

WALTER ERNST.